United States Patent [19]
Paulson

[11] Patent Number: 5,203,164
[45] Date of Patent: Apr. 20, 1993

[54] METHOD AND APPARATUS FOR QUIETING A TURBOJET ENGINE

[76] Inventor: Allen E. Paulson, P.O. Box 2206, Savannah, Ga. 31402

[21] Appl. No.: 654,584

[22] Filed: Feb. 13, 1991

Related U.S. Application Data

[63] Continuation-in-part of Ser. No. 534,525, Jun. 6, 1990, abandoned.

[51] Int. Cl.⁵ .......................... F02K 3/02; F01N 1/14
[52] U.S. Cl. ................................... 60/226.1; 60/226.2; 60/269; 60/280; 181/213; 181/220; 181/225
[58] Field of Search ............... 60/226.1, 226.2, 262, 60/263, 269, 280, 689, 725, 39.5; 181/213, 217, 220, 225; 244/1 N, 53 R, 74

[56] References Cited

U.S. PATENT DOCUMENTS

| | | | |
|---|---|---|---|
| 2,915,136 | 12/1959 | Ringleb | 181/213 |
| 3,027,710 | 4/1962 | Maytner | 181/213 |
| 3,282,053 | 11/1966 | Messerschmitt | 60/226.1 |
| 3,332,241 | 7/1967 | Coplin | 60/226.1 |
| 3,348,379 | 10/1967 | Wilde et al. | 60/226.1 |
| 3,613,827 | 10/1971 | Labussiere | 181/215 |
| 3,811,791 | 5/1974 | Cotton | 60/226.1 |
| 3,968,647 | 7/1976 | Boudigues | 60/262 |
| 4,055,949 | 11/1977 | Boudigues | 60/262 |
| 4,099,375 | 7/1978 | Inglee | 60/39.5 |
| 4,410,152 | 10/1983 | Kennedy et al. | 60/226.2 |
| 4,592,202 | 6/1986 | Stewart et al. | 60/269 |
| 4,909,346 | 3/1990 | Torkelson | 181/213 |

*Primary Examiner*—Charles T. Jordan
*Attorney, Agent, or Firm*—Jones & Askew

[57] ABSTRACT

A noise suppressor for attachment to the aft end of an existing turbojet engine. The noise suppressor includes a free-running turbofan wheel which includes a turbine section mounted for reaction to the exhaust gas from the jet engine, and a concentric outer fan section extending within an air duct concentric with the turbofan wheel. The jet exhaust from normal operation of the jet engine spins the free-running turbofan wheel, and the fan section of that wheel produces a flow of compressed air through the duct to surround and mix with the jet exhaust, thereby reducing the noise emission of the jet engine. A thrust reverser and an afterburner are optional for use with the noise suppressor.

11 Claims, 7 Drawing Sheets

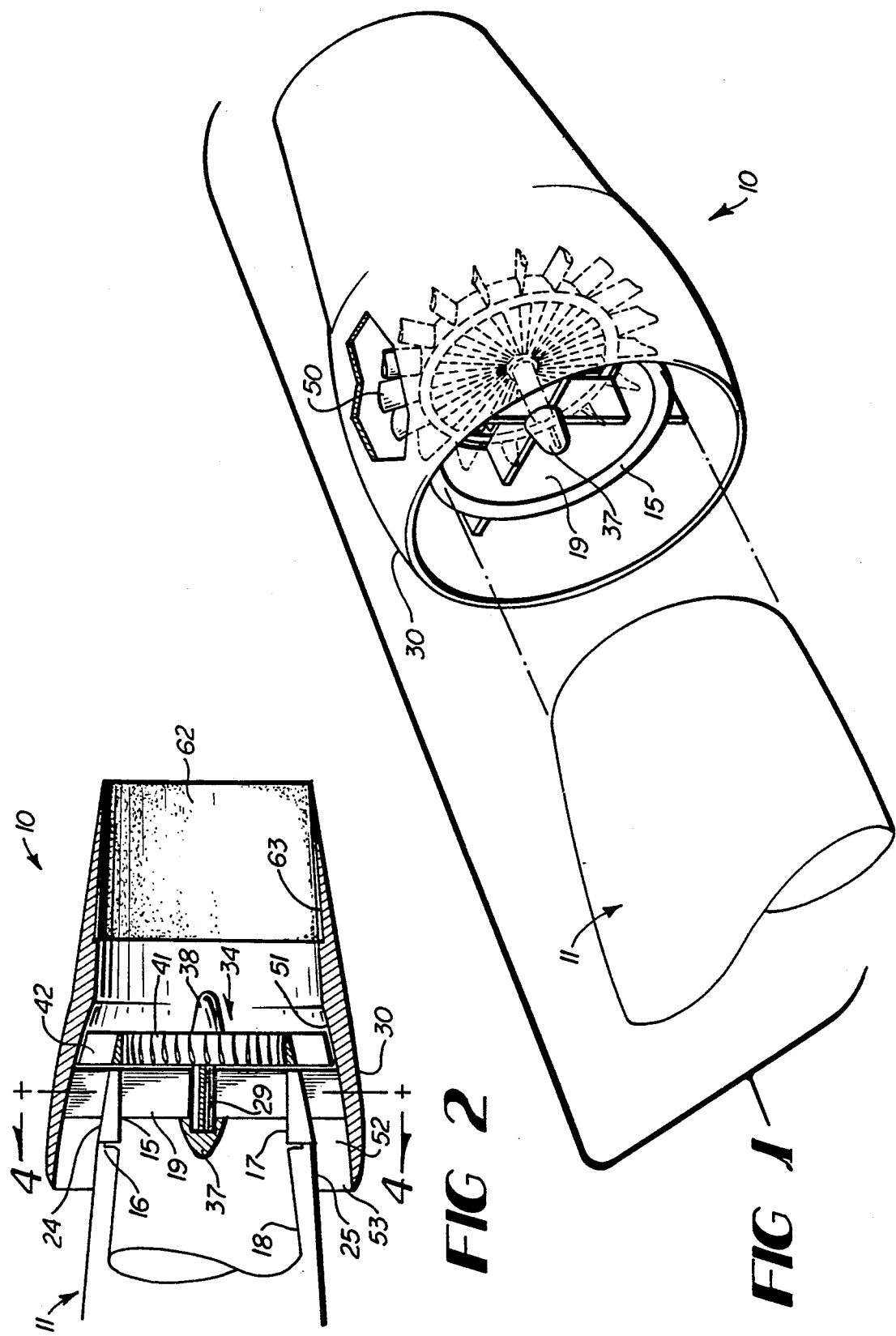

METHOD AND APPARATUS FOR QUIETING A TURBOJET ENGINE

CROSS-REFERENCE TO RELATED INVENTION

This is a continuation-in-part of Ser. No. 534,525, filed Jun. 6, 1990, now abandoned.

FIELD OF THE INVENTION

This invention relates in general to turbojet engines for propelling aircraft, and relates in particular to reducing the noise generated by the jet exhaust from such engines.

BACKGROUND OF THE INVENTION

Turbojet engines develop thrust by expanding a flow of hot gas at high velocity through an outlet at the aft end of the engine. This flow of gas, known as the jet exhaust, flows from the engine outlet at considerable velocity, and this velocity and the mass flow of the jet exhaust produces the forward thrust of the engine. The thrust thus is a function of the velocity and mass flow of the exhaust gases.

Because the jet exhaust requires a relatively high velocity to produce the desired thrust, the noise created by the jet exhaust is loud and objectionable at close range. People living near airports receive the brunt of jet exhaust noise because turbojet engines during takeoff are operating at maximum power to achieve safe takeoff and climbout of the aircraft. Some communities have passed laws prohibiting late-night flights at airports and restricting flight operations at other times, in an effort to reduce the perceived noise on the ground.

The design of turbojet engines has evolved in efforts to reduce the noise created by the jet exhaust. For example, baffles have been attached to the engines surrounding the exhaust outlet in an effort to reduce the component of noise directed downwardly toward the ground. Another such development is the so-called turbofan engine, having an air bypass duct extending rearwardly from an air inlet near the forward end of the engine. The bypass duct extends aft and terminates at an outlet which generally surrounds the exhaust outlet of the engine. A fan is positioned in the inlet end of the bypass duct; this fan is driven by the existing turbine of the engine to produce significant airflow directed rearwardly through the bypass duct. This bypass air surrounds the jet exhaust at the aft end of the turbofan engine, and the bypass air mixes with the jet exhaust to reduce the noise-producing energy of that exhaust. The bypass fan of a turbofan engine also can produce significant amounts of thrust, particularly at relatively low forward velocity of the aircraft where jet engines are relatively inefficient at producing reaction thrust.

Modern turbofan engines generally produce much less jet exhaust noise than do conventional turbojet engines of comparable power. However, aircraft originally equipped with turbojet engines may be restricted or prevented from operating in communities with increasingly-strict noise standards, and those aircraft are not easily or economically modifiable to use turbofan engines. Converting an existing turbojet engine to a turbofan engine heretofore has required a substantial redesign and rebuild of the engine, an expedient which may cost more than the original engine. Replacing the existing turbojet engines with turbofan engines also is expensive. Moreover, such proposed engine swaps seldom are practical because of changes in weight, range, and other factors encountered when substituting engines other than the ones for which the aircraft was designed.

SUMMARY OF INVENTION

Stated in general terms, the present invention attaches to the aft end of an existing conventional turbojet engine and produces a stream of compressed air to move aft and mix with the jet exhaust. The invention includes a free-running turbine driven by the jet exhaust and a fan driven by the freely-rotating turbine to produce the compressed air. The fan creates an air flow within a bypass duct having an air inlet near the aft end of the turbojet engine. The bypass duct allows the compressed air from the fan to move aft and mix with the jet exhaust. This mixing process, along with the presence of the free turbine, slows the jet exhaust and eliminates much of the noise emission that the jet exhaust otherwise would emit.

Stated somewhat less generally, the free-running turbine comprises an inner turbine portion of a turbofan wheel mounted for free rotation behind the exhaust outlet of the turbojet engine. This inner turbine portion has a plurality of turbine blades exposed to the hot gas exhausted from the engine, so as to drive the free-running turbine wheel. The fan comprises an outer radial portion of the free-running turbofan wheel. This outer fan portion has a plurality of fan blades mounted at the tip ends of the turbine blades, and the fan blades are located to compress air entering the air inlet of the bypass duct. These fan blades thus are driven by the free-running turbine so as to produce the flow of compressed air through the bypass duct.

Stated in somewhat greater detail, the present invention includes a free-running turbine mounted within a housing assembly configured for mounting at the aft end of an existing turbojet engine. The housing assembly attaches to the aft flange of the turbojet engine and can replace the original thrust reverser, if any, previously on the engine. The free-running turbofan wheel turns on bearings carried by support structure within the housing, so that the free-running turbofan wheel remains structurally and functionally independent of the existing driveshaft and other rotating components of the turbojet engine. The housing assembly includes a portion defining the bypass duct generally concentric with the centerline of the turbojet engine and having an air inlet adjacent the aft end of the engine. The fan blades extend outwardly from the turbine blades of the free-running turbine wheel and rotate with the turbine wheel to compress air within the bypass dust, so that the air exits the duct in substantially surrounding relation to the jet exhaust and thereby reduces the exhaust noise as perceived on the ground. The turbine blades of the free-running turbofan wheel thus are exposed only to the jet exhaust, and the bypass fan blades of that wheel are exposed to the air entering the forward end of the bypass duct. The rotation speed of the free-running turbofan wheel, for a given turbojet engine and throttle setting, depends on variables including the pitch and number of blades in the free-running turbine, and the pitch and number of fan blades which make up the load driven by the free-running turbine. The entire assembly of the present invention thus defines a self-contained unit which is installed at the aft end of the engine in place of the existing tailpipe or thrust reverser, and which requires no external control or other operating linkage with the engine for its operation.

A thrust reverser can be provided in combination with the free-running turbine of the present invention, if considered necessary or desirable in particular applications. Stated somewhat generally, thrust reversal according to the present invention is accomplished by selectively redirecting the jet exhaust away from the inlet side of the free turbine so that the exhaust exits near the aft end of the engine in a direction having a forward component. The redirected jet exhaust thus provides the engine with a reverse component of thrust, that is, a component of thrust forwardly directed along the longitudinal axis of the engine.

Stated in somewhat greater detail, thrust reversal according to the present invention is accomplished by providing at least one exhaust blocker door, and preferably a pair of such doors, located at the aft end of the engine. These blocker doors are selectively movable to assume either a normal position wherein the blocker doors are removed from the path of the jet exhaust flowing from the engine outlet to the free turbine, or to a reverse thrust position in which the blocker doors substantially block the exhaust path to the free turbine. When the blocker doors are deployed in the thrust reversal position, the exhaust gas is deflected from its normal rearward axial path and instead exits the engine through lateral openings provided for that purpose in the side of the cowl surrounding the thrust reverser apparatus. These lateral openings are closed by corresponding cowl doors during normal operation of the engine. An actuating mechanism moves the blocker doors from the normal position to the thrust reversal position and concurrently opens the cowl doors to permit reverse-thrust passage of the jet exhaust, or vice versa. The configuration of the blocker doors imparts a forwardly-directed component of flow to the jet exhaust when the blocker doors are deployed to the thrust reversal position.

Noise reduction by providing a free-running turbine aft of the turbojet engine as described herein is useful for supersonic as well as subsonic aircraft. For use in supersonic applications, the free-running aft fan may create considerable drag but it becomes practical to minimize that drag by shutting off the fan from the outside airstream. The jet exhaust is introduced to both the free-running aft fan and aft turbine at that time, to prevent compressor stall of the aft fan and to increase the mass flow rate of hot gas exhausted from the engine. Turbojet engines intended for supersonic operation and equipped according to the present invention will typically use the free-running aft fan during take-off and climb-out operations where the suppression of perceived noise is important, but not while operating at higher altitudes and at high mach number.

As an optional feature of the present invention, an afterburner is provided by an additional fuel burner located either immediately forward of the free turbine or aft of the free turbine. Placing the afterburner in front of the free turbine increases the power available from the free turbine and, therefore, the fan portion of the free turbine wheel creates more thrust. This afterburner option is useful in an engine for supersonic operation, as the afterburner would selectively give added thrust without the added associated jet noise during takeoff and initial climb.

Accordingly, it is an object of the present invention to provide an improved method and apparatus for reducing the noise of turbojet engines.

It is another object of the present invention to provide a method and apparatus of modifying existing turbojet engines to reduce jet exhaust noise.

It is yet another object of the present invention to provide a method and apparatus of reducing jet noise of a turbojet engine while increasing the available thrust at given power settings of the engine.

It is a further object of the present invention to provide a self-contained unitary assembly for attachment to turbojet engines so as to reduce the jet exhaust noise of the engines.

It is still another object of the present invention to utilize a free turbofan for suppressing noise of a turbojet engine during takeoff or other flight operations while selectively shutting off the free turbofan at other times.

Other objects and advantages of the present invention will become more readily apparent from the following description of a preferred embodiment.

BRIEF DESCRIPTION OF DRAWINGS

FIG. 1 is a pictorial view showing a conventional turbojet engine with quieting apparatus according to a preferred first embodiment of the present invention. The quieting apparatus is shown removed from the engine and partially cutaway for illustration.

FIG. 2 is a plan view of the engine with the quieting apparatus shown in FIG. 1, installed on the aft end of the engine and with only the turbine blades of the free-running turbofan being shown in detail.

DESCRIPTION OF PREFERRED EMBODIMENTS

Figure 4:
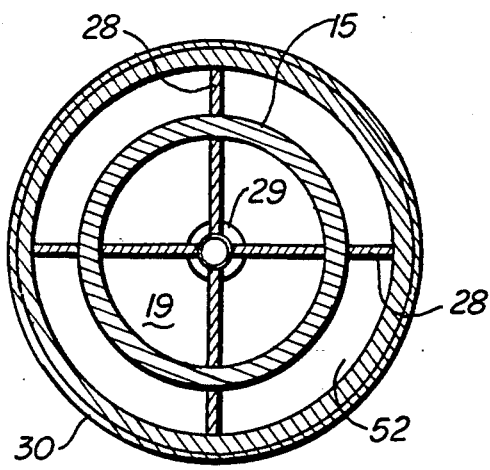
FIG. 4 is a section view taken along line 4—4 of FIG. 2.

Turning first to FIGS. 1 and 2, there is shown generally at 10 a free turbine noise suppressor according to the disclosed embodiment of the invention. The noise suppressor 10 is shown in FIG. 1 removed from the aft end of a conventional turbojet engine 11, and is shown in FIG. 2 attached to the engine. The turbojet engine 11 is of conventional design and is attached to an engine mounting pylon (not shown) which extends from the fuselage of an aircraft having aft-mounted engines, although the present invention is not limited thereto. An actual embodiment of the present invention is intended for use with the Rolls-Royce Spey engine, although those skilled in the art will realize that the method and apparatus of the present noise suppressor is equally adaptable to other conventional turbojet engines such as the Pratt and Whitney JT-8 and JT-4, and so on.

The noise suppressor 10 has internal support structure 15 with a forward end designed to mate with the existing aft flange 16 of the engine 11. The thrust reverser and any existing jet exhaust baffles are permanently removed from the engine 11 to accommodate attachment of the noise suppressor 10 to the aft flange 16 of the engine. The support structure 15 has the shape of an annular ring having a cylindrical inner surface 17 substantially colinear with the exhaust throat 18 of the engine 11 adjacent the aft flange 16. The inner surface 17 of the support structure 15 thus defines a generally cylindrical passage 19 coaxial with the centerline of the engine 11. The outer surface 24 of the support structure 15 is configured to provide a smooth continuation of the engine nacelle 25 at the aft end of the engine.

A number of support struts 28 extend radially through the support structure 15 of the noise suppressor 10. Four such support struts 28 are used in the disclosed embodiment, and the inner ends of those support struts are secured to the bearing hub 29 on the centerline of the noise suppressor. The placement of the support struts 28 and the bearing hub 29 is best seen in FIG. 4. The support struts 28 are secured to the support structure 15 and extend radially outwardly from the support structure to end in attachment with the bypass duct 30 forming the radially-outermost extent of the noise suppressor 10.

Mounted for free rotation within the noise suppressor 10 is the free turbofan wheel 34. The wheel 34 is mounted on the shaft 35 supported by bearings located in the bearing hub 29. Streamlined fairings 37 and 38 (FIG. 2) close the forward and aft ends of the shaft 35. The free turbofan wheel 34 thus is free to rotate within the noise suppressor 10.

Figure 5:
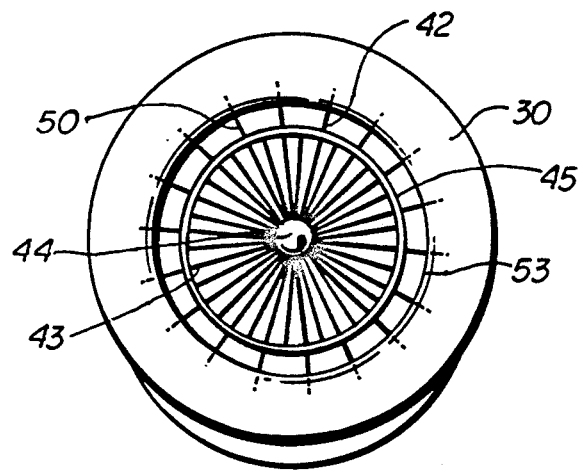
FIG. 5 is a section view taken along line 5—5 of FIG. 3.
Figure 3:
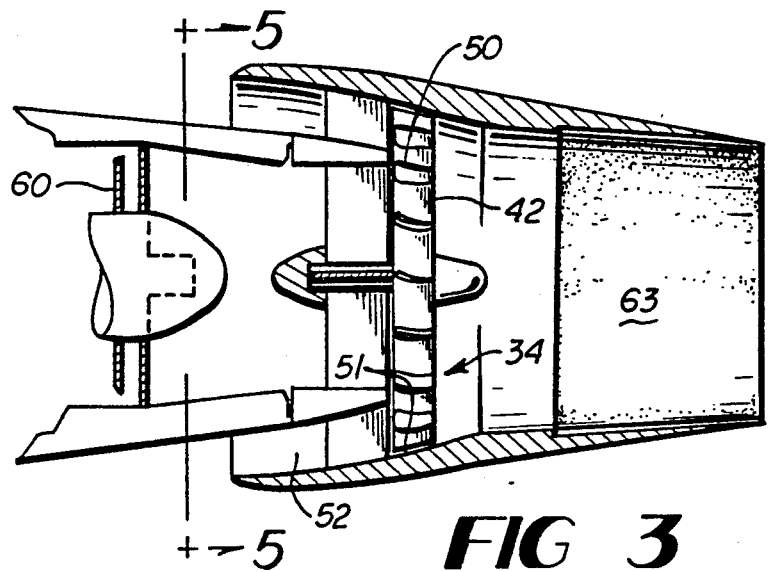
FIG. 3 is a side view of the engine and quieting apparatus shown in FIG. 2, except that only the bypass fan blades of the free-running turbofan are shown.
Figure 6:
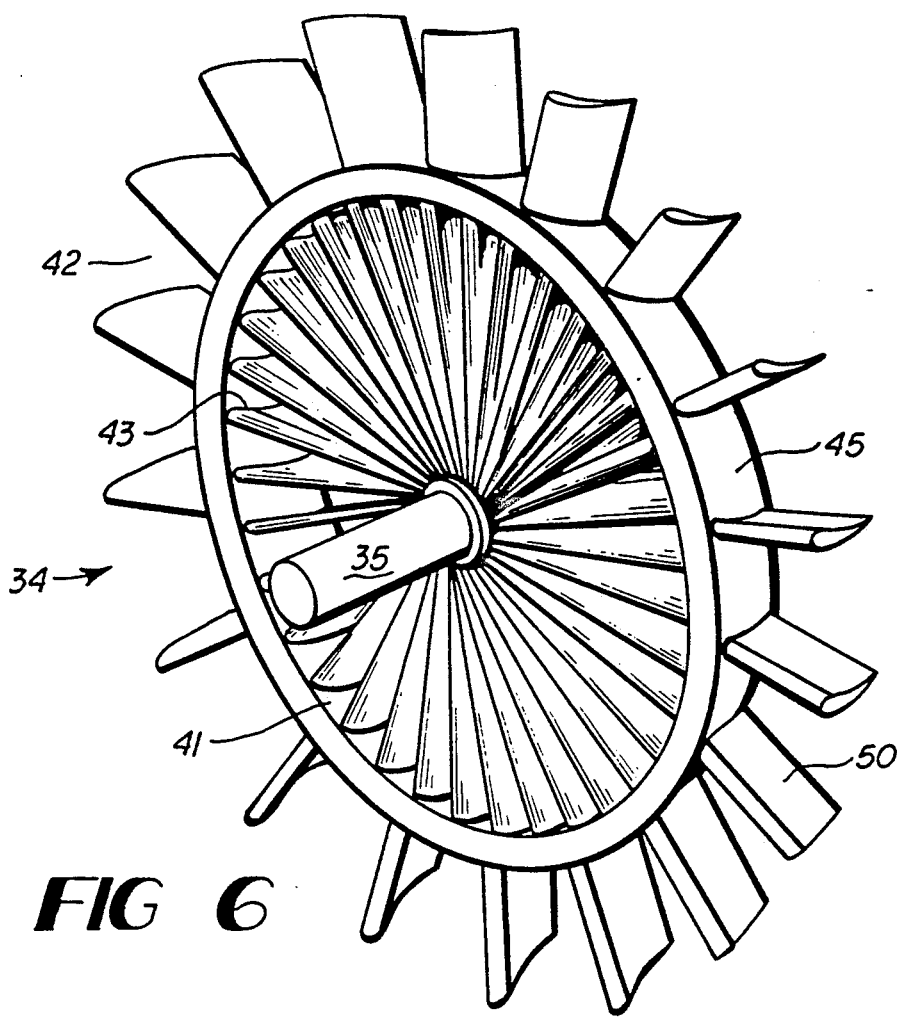
FIG. 6 is an isometric view showing the free-running turbofan wheel used in the present embodiment.

The free turbofan wheel 34 has an inner section comprising a turbine 41 (FIGS. 2 and 6) and a concentric outer portion 42 comprising a fan section (FIGS. 3 and 6). FIG. 5 best shows the overall layout of the free turbofan wheel 34. The turbine section 41 comprises a number of turbine blades 43 having inner ends mounted on the hub 44 and outer ends terminating in a ring 45. The length of the turbine blades 43 is chosen so that the turbine section 41 of the free turbofan wheel 34 is substantially coextensive with the diameter of the passage 19 through the support structure 15. The forward plane defined by the free turbofan wheel 34 is located immediately behind the aft edge of the support structure 15. The turbine section 41 thus receives the full effect of exhaust gases from the jet exhaust throat 18 flowing through the passage 19, as explained below.

The fan section 42 comprises a number of fan blades 50 mounted on the ring 45 of the free turbofan wheel 34 and extending radially out from that ring. The outer ends of the fan blades 50 terminate in close proximity to the inner surface 51 of the bypass duct 30, as best seen in FIG. 3. The inner surface 51 of the bypass duct is spaced apart from the support structure 15 and the engine nacelle 25, so that the bypass duct defines a generally-circumferential airflow passage 52 which surrounds the aft end of the engine. The bypass duct 30 at its forward end defines an air inlet 53 for the airflow passage 52. The outer ends 56 of the fan blades 50 terminate just short of the confronting inner surface 51 of the bypass duct 30, and those outer ends are contoured to match the contour on the facing portion of the confronting inner surface. The radial extent of the fan blades 50 matches that of the airflow passage 52 upstream of the fan section 42.

The installation and operation of the free turbine noise suppressor 10 is now discussed. As mentioned previously, the noise suppressor 10 is installed at the aft end of an existing turbojet engine 11 after first removing any thrust or exhaust baffles originally extending behind the aft flange 16 of that engine. With the noise suppressor 10 thus mounted on the engine, the free turbofan wheel 34 is positioned behind the exhaust throat 18 of the engine and well aft of the turbine 60 (FIG. 3) forming part of the conventional turbojet engine. The turbine section 41 of the free turbofan wheel 34 thus is aligned to receive only the jet exhaust from the engine 11, and the fan section 42 is aligned to receive only ambient air entering the inlet 53 at the front end of the bypass duct 30.

The exhaust gases caused by normal operation of the turbojet engine 11 pass through the turbine section 41 of the noise suppressor 10, so that part of the energy in the jet exhaust goes to rotate the free turbofan wheel 34. As the turbofan wheel 34 rotates, the fan section 42 compresses air entering the air inlet 53 and moving through the air flow passage 52, and the compressed air flow downstream from the fan section to form a generally cylindrical column of compressed air which surrounds the jet exhaust downstream of the free turbofan wheel. This flow of compressed air from the fan section 42 mixes with the jet exhaust and eliminates much of the noise emission the jet exhaust otherwise would create. The reduction in velocity of the jet exhaust passing through the turbine section 41 also reduces the noise of that exhaust. The outlet end 62 of the bypass duct 30 has an acoustic liner 63 which further helps reduce the acoustic energy of the jet passing through the bypass duct. The cross-sectional area at the outlet 62 of the bypass duct 30 preferably is no less than the area of the exhaust throat 18 on the engine 11, so as to avoid a constriction which would increase the velocity and attendant noise of the jet exhaust leaving the noise suppressor 10.

No speed control or other operational mechanism is associated with the noise suppressor 10 as disclosed thus far. The turbofan wheel 34 rotates freely and independently of the engine shaft in the existing engine 11. The free turbofan wheel 34 rotates at a speed determined by the number and pitch of the turbine blades 43 and the mass flow rate of jet exhaust gases acting on those blades, and by the number and pitch of the fan blades 50 and the density of air acting on those blades providing the load driven by the turbine section. The pitch and other factors of both the turbine and fan blades thus must be chosen to prevent the free turbine wheel from exceeding a desired maximum speed of rotation at full-throttle operation of the particular engine 11 for which the noise suppressor 10 is designed. The rotational speed of the free turbofan wheel 34 is self-regulating as a function of throttle setting for the engine 11; an increase in engine power increases the mass flow rate of the jet exhaust, causing the free turbofan wheel 34 to spool up and deliver a greater volume of fan air to suppress the increased noise of the jet exhaust.

The fan section 42 of the noise suppressor 10 also provides a significant net increase in thrust at given throttle settings of the engine 11. This increase in available thrust means that one can decrease the engine power during takeoff without reducing the available thrust, thereby reducing fuel consumption and further reducing the jet exhaust noise of a turbojet engine equipped with the present noise suppressor. This reduced fuel consumption also reduces pollution and increases the range of the aircraft.

Figure 7:
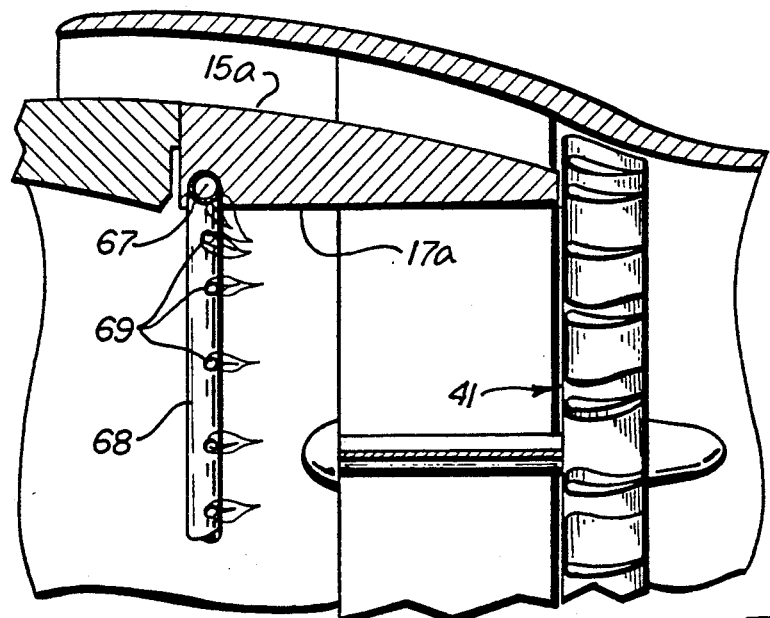
FIG. 7 is an enlarged fragmentary view showing details of the optional afterburner apparatus according to a modified embodiment of the present invention.

A modified embodiment of the noise suppressor including an optional afterburner mode is shown in FIG. 7. A fuel gallery 67 is formed in the support structure 15a and is selectively supplied with jet fuel through an inlet leading to the fuel gallery. A series of fuel injecting nozzles 69 is provided along a circumferential path 68 on the inner surface 17a of the support structure 15a. Each nozzle 69 communicates with the fuel gallery 67 and operates to inject a spray of jet fuel into the jet exhaust flowing from the conventional jet engine 11 to the turbine section 41 of the noise suppressor 10.

Fuel is selectively supplied to the fuel gallery 67 through a suitable afterburner fuel control to operate the afterburner whenever additional thrust is required, for example, during takeoff and initial climb or during supersonic operation. Fuel from the nozzles 69 enters the hot gases of the jet exhaust and burns upstream of the turbine section 41 in the noise suppressor. The afterburner thus increases thrust due to the increased mass flow rate of the jet exhaust, and also provides more thrust from the fan section of the noise suppressor. This increased turbofan thrust thus gives added thrust without the added jet noise associated with conventional afterburner operation.

Figure 8:
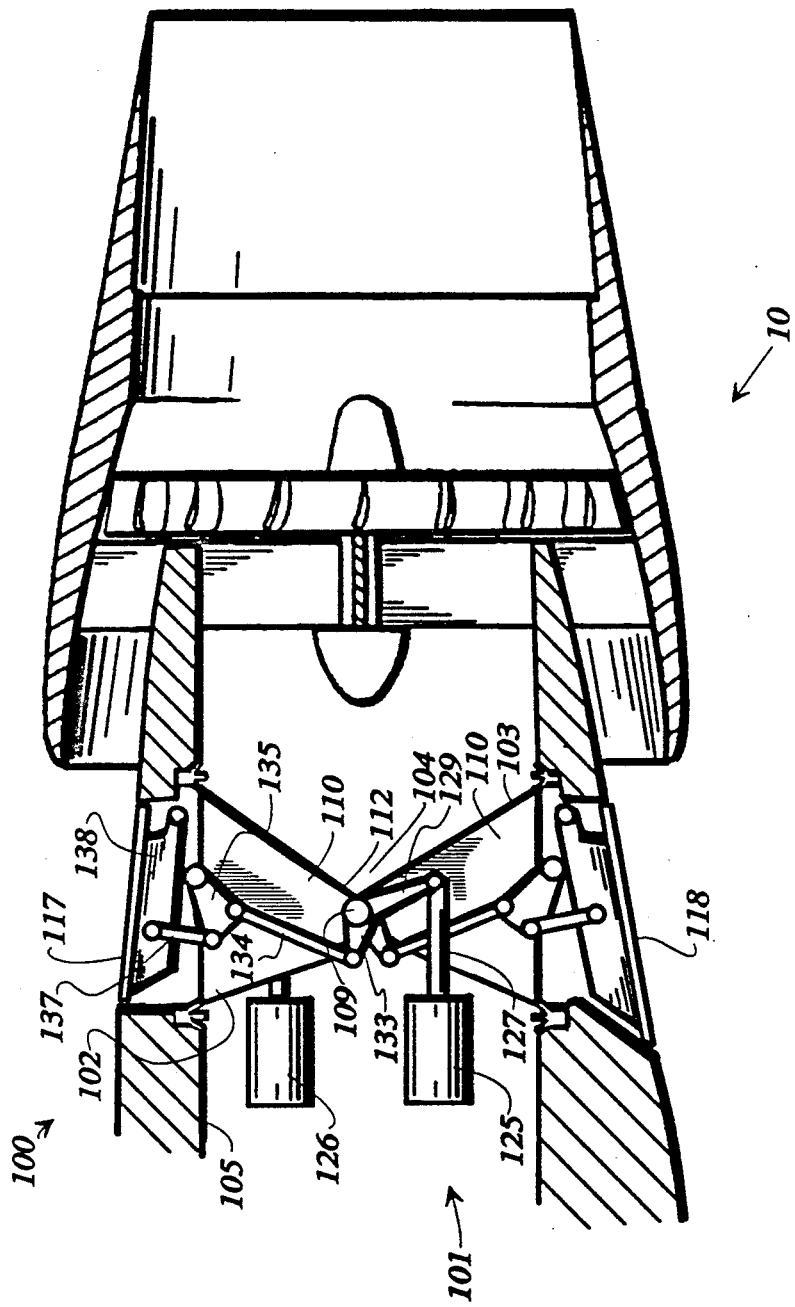
FIG. 8 is a section view of a second embodiment according to the present invention, showing a thrust reverser in combination with the quieting apparatus.
Figure 9:
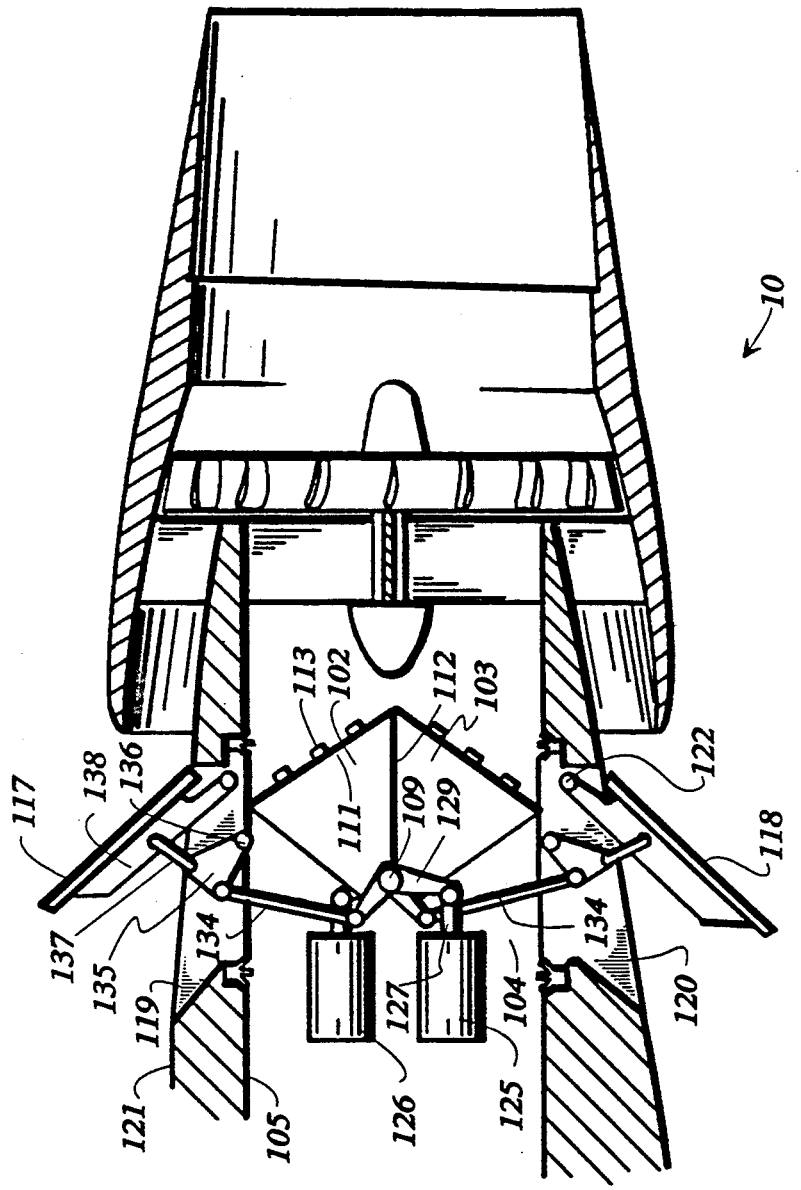
FIG. 9 is a section view as in FIG. 8, but showing the thrust reverser deployed in reverse-thrust mode.
Figure 10:
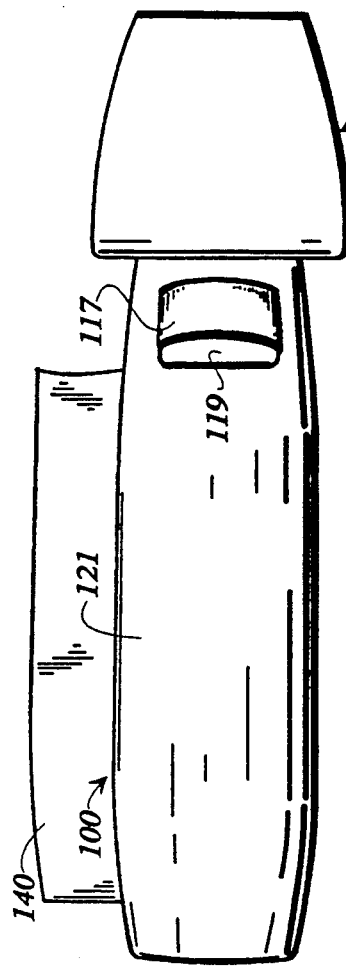
FIG. 10 is a top plan view of a turbojet engine as in FIGS. 9 and 10, and including a fragmentary pylon attaching the engine to the fuselage of the aircraft.

Operation of turbojet engines equipped with the present noise suppressor is contemplated without the thrust reverser which may have been removed to accommodate the noise suppressor. It is also contemplated that the fan blades of the present noise suppressor could be selectively reversed, thereby giving a thrust-reverser option to the noise suppressor. This option would be a substantial weight savings over the thrust reversers presently installed on turbojet engines. However, the noise suppressor of the present invention is compatible with a thrust reverser which fits between the engine outlet and the free-turbine noise suppressor and selectively diverts the jet exhaust from its normal axial flow to a reverse-thrust flow having a forward component of direction. An embodiment of this thrust reversing apparatus is shown in FIGS. 8-10 wherein the free-turbine noise suppressor 10 as previously described is mounted at the aft end of the turbojet engine 100 equipped with the trust reverser 101 according to the present invention.

The thrust reverser 101 includes a pair of blocker doors 102 and 103 located within the generally cylindrical chamber 104 defined by the casing 105 of the engine 100. The inner chamber 104 is located immediately forward of the free-turbine noise suppressor 12, and it should be understood that the inner chamber is aft of the conventional turbine (not shown) forming part of the engine 100.

Each blocker door 102, 103 includes a pair of generally triangular side walls 110 (only one of which is visible in FIGS. 8 and 9) spaced apart from each other along the pivot axis 109 which joins the side walls substantially in line with one edge 112 thereof, adjacent the apex defined by that edge and the confronting edge. An end plate 111 joins each side wall 110 at the ends thereof opposite the pivot axis 109, and extends between the side walls. As will be seen, the two blocker doors 102, 103 move between normal and deployed positions in clamshell fashion. All elements of the blocker doors 102, 103 are designed to withstand the heat and vibration present within the inner chamber 104 of the engine, with especial attention paid to the end plate 111 which contains reinforcing ribs 113 on the back side thereof to help withstand the force of engine thrust when the blocker doors are deployed. The blocker doors 102, 103 are shown in FIG. 8 stowed during normal operation of the engine 100, and are shown in FIG. 9 deployed to substantially block the jet exhaust from reaching the noise suppressor 10.

The thrust reverser apparatus 100 further includes a pair of cowl doors 117 and 118 mounted in openings 119, 120 in the cowl 121 surrounding the inner casing 105 of the engine 100. The cowl openings 119, 120 are located in approximate lateral alignment with the pivot axis 109 of the blocker doors 102, 103. Each cowl door 117, 118 is pivotably attached to the casing 105 by the pivot 122 at the aft end of the door, so that each cowl door can pivot outwardly from the cowl 121 to expose the openings 119, 120. The exterior face of each cowl door when closed lies substantially flush with the cowl 121, as seen in FIG. 8.

Each cowl door 117, 118 and its respective blocker door 102, 103 move concurrently between the normal or non-thrust reversing position, where the blocker doors and the cowl doors are stowed in nonoperating position as shown in FIG. 8, and the thrust reversing position as shown in FIG. 9 where the blocker doors are deployed to divert the axial flow of jet exhaust and the cowl doors are opened so that the diverted jet exhaust flows out through the open cowl doors with a forward directional component. In the disclosed embodiment, this concurrent operation of the upper blocker door 102 and the upper cowl door 117 is accomplished by a first pneumatic actuator 125 linked to the upper blocker door and the corresponding upper cowl door. In similar manner, a second pneumatic actuator 126 is linked to operate the lower blocker door 103 and the lower cowl door 118.

The linkage interconnecting the actuator 125 with the upper blocker door 102 and the upper cowl door 117 is described herein, it being understood that a similar linkage extends between the pneumatic actuator 126 and the corresponding lower doors. The actuator rod 127 extending from the actuator 125 is connected to one arm of the bell crank 129. The center of the bell crank 129 is attached to the pivot axis 109, which in turn connects to and pivots the upper blocker door 102. It should now be apparent that retraction of the actuator rod 127 rotates the bell crank 129 about the pivot axis 109, pivoting the upper blocker door 102 from the stowed position shown in FIG. 8 to the thrust-deflecting position shown in FIG. 9.

Connected to the other arm 133 of the bell crank 129 is an elongated link 134 which extends generally upwardly for pivotable attachment to the triangular link 135 pivotably secured at 136 to the engine casing 105 at a location within the opening 119 for the upper cowl door 117. A shorter elongated link 137 extends from the triangular link 135 for pivotable attachment to the frame 138 on the inside of the upper cowl door 117.

With the actuator rod 117 fully extended from the actuator 125 as shown in FIG. 8, the bell crank 129 is as a maximum counter-clockwise position and the elongated link 134 pivots the triangular link 135 downwardly to draw the upper cowl door 117 closed as shown in FIG. 8. However, when the bell crank 129 is rotated clockwise by retraction of the actuator 125, the link 134 extends upwardly and pivots the triangular link 135 clockwise about the pivot 136 as viewed in FIG. 9, thereby deploying the cowl door 117 to the position shown in that figure. As pointed out previously, the lower blocker door 103 and the lower cowl door 118 are concurrently and simultaneously actuated by the pneumatic actuator 126 such that both blocker doors 102 and 103 are positioned to deflect the jet exhaust toward the openings 119 and 120, from which the cowl doors are now deployed. The diverted jet exhaust thus flows outwardly through the openings 119 and 120 in a direction having a forward component due to the orientation of the blocker door end plates 111 in the thrust-reversing position. This forward direction of the exhaust gases through the thrust reversor openings 119 and 120 symmetrically located with respect to the longitudinal axis of the engine 100 thus produces a reverse thrust tending to decelerate the aircraft to which the engines are attached by the pylon 140, FIG. 10.

Those skilled in the art will appreciate that the present apparatus can be modified to accomplish thrust vectoring by directing the deflected jet exhaust along other desired paths.

Figure 11:
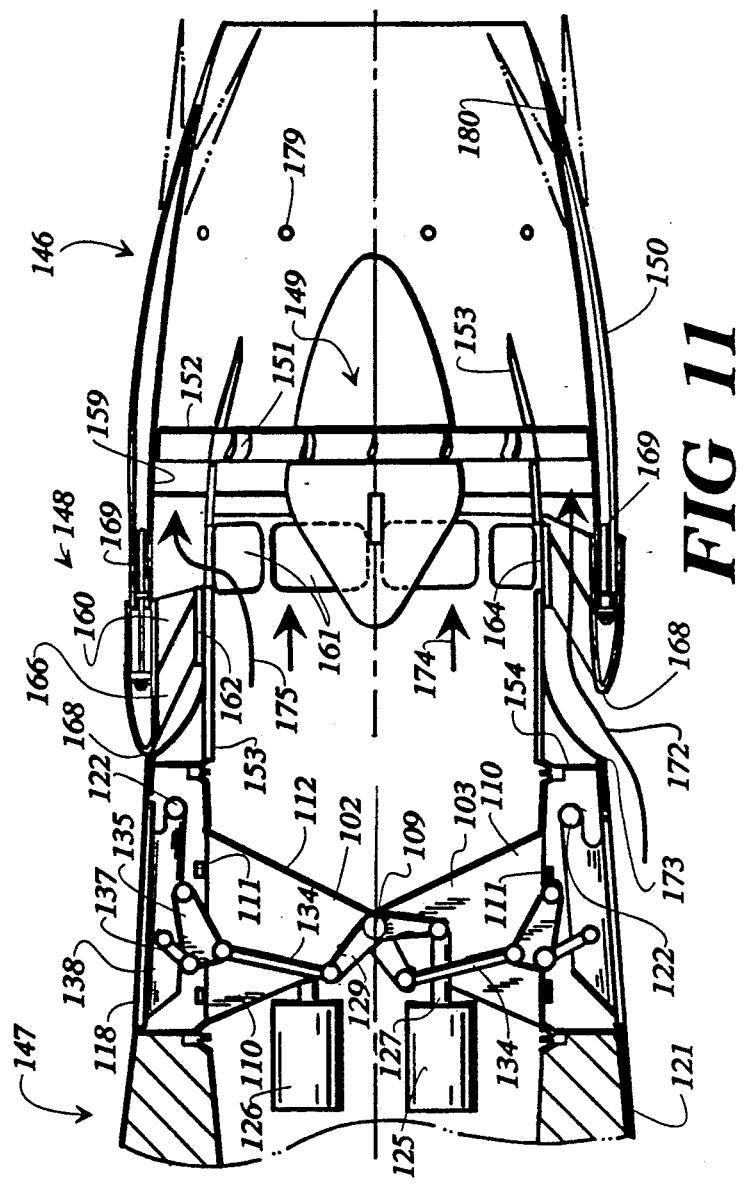
FIG. 11 is a section view of a third embodiment according to the present invention, including a thrust reverser showing the reverser mechanism stowed and also including a mechanism to selectively shut off the fan of the free-running turbofan from outside air and to introduce the jet exhaust gases to both turbine and fan sections of the free-running turbofan. The upper portion of the latter mechanism is shown deployed for cruise operation, and for illustrative purposes the lower portion of that mechanism is shown in the position activating the fan of the free-running turbine for takeoff and landing airflow.

FIG. 11 shows the present free-turbine noise suppressor in an alternative embodiment intended for supersonic aircraft. The embodiment shown in FIG. 11 also is equipped with a thrust reverser apparatus as generally shown in FIGS. 8-10. Although a free-turbine noise suppressor of the embodiment shown in FIGS. 1-10 is suited for use on subsonic aircraft, that embodiment has certain operational disadvantages for supersonic speed. To begin with, the bypass duct 30 extends radially outwardly from the cowl of the engine and would create considerable drag in flight operations at high mach number. Furthermore, because supersonic flight for civil aviation nearly always occurs at high altitude where the ambient air is cold and more dense relative to air encountered during take off and landing, it becomes practical to shut off the free-running aft fan from the outside airstream and to introduce the jet exhaust from the engine to both the aft fan and the aft turbine of the free-turbine noise suppressor. This operation will increase the hot gas mass airflow, which will give more thrust for supersonic flight, in addition to reducing drag otherwise associated with the noise suppressor.

Turning now to FIG. 11, the noise suppressor shown generally at 146 is mounted at the aft end of the engine 147, immediately behind the thrust reverser 148. The noise suppressor 146 includes a free-running turbofan assembly 149 mounted within the cowl 150 and including a turbine 151 and a fan 152, similar to the turbofan wheel 34 previously discussed. An inner duct 153 is mounted within the cowl 150 concentric with the turbofan assembly 149 and radially aligned to coincide with the annular boundary between the turbine 151 and the fan 152 peripheral to the turbine. The inner duct 153 extends forwardly within the cowl 150 to terminate at the forward end 154 of the noise suppressor assembly 146, and directs the flow of exhaust gases from the engine 147 to the turbine 151 of the free-running turbine assembly 149. The inner duct 153 also extends aft of the free-running turbofan 149, flaring inwardly to direct the flow of compressed air downstream from the fan 152.

The inner duct 153 is spaced radially inwardly from the inside wall 159 of the cowl 150, defining a concentric channel 160 upstream of the turbofan assembly 149 and leading to the inlet of the fan 152. A series of openings 161 are formed in the inner duct 153 along a circumferential path around the periphery of the inner duct at a location upstream from the turbofan assembly 149. These openings 161 are selectively blocked by the doors 162 located on the exterior of the inner duct 153.

The doors 162 are supported for translational movement on the arms 166 which are mounted for movement with the forward cowl assembly 168 concentric with the cowl 150 on the noise suppressor 146. The movable forward cowl assembly 168 extends around the circumference of the noise suppressor 146 and may be unitary or segmented in construction. A plurality of screw jacks 169 are connected between the movable forward cowl assembly 168 and the fixed cowl 150, to translate the movable cowl assembly and the doors 162 between the forward position shown in the upper part of FIG. 11 and the rearward position shown on the lower part of that figure.

The movable cowl assembly 168 in its forwardmost position closes the open forward end 172 of the annular channel 160 leading to the inlet side of the fan 152. The exterior contour of the movable cowl assembly 168 preferably is in substantial streamline relation to the cowl 173 at the aft end of the thrust reverser 148, so as to minimize drag when the movable cowl assembly 168 is in the forward position closing the forward end 172 of the channel 160. As pointed out previously, the arms 166 carrying the doors 162 are translated in the forward and aft directions together with the movable cowl assembly 168 as the screw jacks 169 operate at the control of the flight crew.

Considering the operation of the noise suppressor 146 during take-off and landing or other relatively low-altitude operations, the screw jacks 169 are operated to retract the movable cowl assembly 168 from the open end 172 of the channel 160, thereby allowing outside air to enter the channel. It should be understood that the entire movable cowl assembly 168 is either opened or closed, and that FIG. 11 shows the upper portion closed and the lower portion opened only to illustrate both positions of the movable cowl assembly. With the movable cowl assembly 168 retracted and the openings 161 closed by the doors 162, the free-running turbofan assembly 149 operates as previously described for the first embodiment described above. The jet exhaust from the engine 147 enters the noise suppressor 146 and flows through the turbine 151, as indicated by the flow arrow 174 on the lower half of FIG. 11. The fan 152 thus operates to draw ambient air through the open forward end 172 of the channel 160, forming a generally cylindrical column of compressed air which surrounds the jet exhaust downstream from the free-running turbofan 149 and reducing the perceived noise of the jet exhaust.

When the airplane reaches sufficient altitude so that perceived noise of the engine no longer presents a problem, the jack screws 169 are operated to translate the movable cowl assembly 168 forwardly to the position shown on the upper half of FIG. 11. This movement closes the forward end 172 of the channel 160, blocking the flow of outside air to the fan 152. At the same time, forward movement of the cowl assembly 168 translates the doors 162 forwardly from the opening 161 around the inner duct 153, thereby opening a path to introduce part of the jet exhaust to the inlet of the fan 152 as shown by the flow arrow 175 on the upper half of FIG. 11. The supply of engine exhaust to the fan 152 prevents the fan from stalling, which could otherwise occur in the absence of inlet air when the forward end 172 of the channel 160 is closed.

The noise suppressor 146 thus obtains the noise reducing benefits of the free-running aft turbofan in an engine intended for supersonic operation, while avoiding unnecessary drag and power loss when operating at high mach numbers. However, it should be understood that a noise suppressor as disclosed in FIG. 11 could also be used in engines limited to subsonic operation. For example, if the fan 152 of the free-running turbofan assembly 149 produced undesirable fan noise in the approach mode of the aircraft, that noise could be eliminated or substantially reduced by blocking the forward end 172 to close the fan off in the approach mode. This will slow the aft fan down to a slower speed because the engine typically is operating at reduced throttle during the approach mode, and will also block the fan noise from going forward through the high-speed fan in the engine itself.

Figure 12:
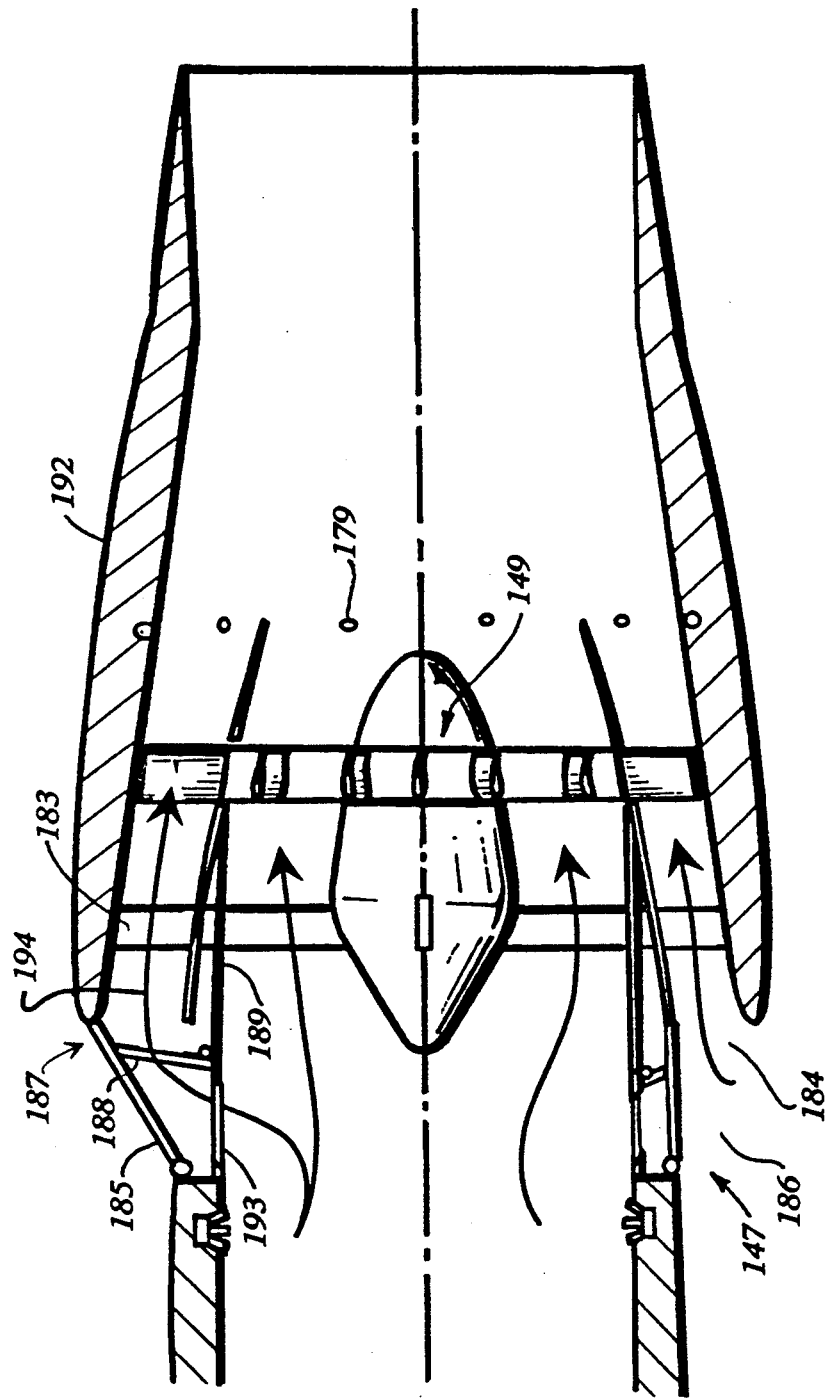
FIG. 12 is a section view of a fourth embodiment according to the present invention, showing an alternative structure for selectively shutting off the flow of outside air to the fan of the free-running turbofan.

FIG. 12 shows an alternative arrangement for selectively shutting off the supply of outside air to the inlet of the fan 152 in the free turbofan 149. The inlet 184 at the forward end of the channel 183 leading to the fan 152 is equipped with doors 185 hinged at their forward ends to pivot between the stowed position used during takeoff and shown at 186 on the bottom of FIG. 12, and the deployed position used during cruise and shown at 187 on the top of that figure. The doors 185 are moved to the stowed or deployed positions by actuators such as the screw jacks 188 extending between the doors and the casing 189 which extends aft from the engine 147 and defines the path for the jet exhaust leading to the turbine inlet of the turbofan 149. The casing 189 is spaced radially inwardly from the cowl 192 to define the air flow channel 183 to the turbofan 149.

A series of openings 193 are formed in the casing 189 along a circumferential path located upstream from the turbofan assembly 149, similar to the openings 161 in FIG. 11. These openings 193 allow a portion of the exhaust from the engine to enter the channel 183, as shown by the flow arrow 194, when the doors 185 are deployed to close the air inlets 184. However, moving the doors 185 to the stowed position, shown on the bottom of FIG. 11, blocks the flow of jet exhaust through the openings 193 in the casing 189 and also opens the air inlets 184 leading to the fan of the free turbofan 149. The doors 185 thus combine the functions of the movable cowl assembly 168 and the doors 162 in the embodiment of FIG. 11.

The embodiments shown in FIGS. 11 and 12 also can include an optional afterburner provided by the fuel gallery 179 located aft of the free-turbofan assembly 149. As with the afterburner arrangement previously described with regard to FIG. 7, fuel is supplied to the fuel gallery 179 to operate the afterburner whenever additional thrust is required during selected flight operations. This fuel enters the hot jet exhaust immediately downstream from the free-running turbofan 149 and ignites to produce increased thrust. Mass flow of the jet exhaust during operation of the afterburner is controlled by the variable-geometry exit nozzle 180 at the tip of the tailpipe.

Although the afterburner fuel gallery 179 is shown and described as located aft of the free-turbofan assembly 149 in the embodiment of FIG. 11, it should be understood that this afterburner optionally can be located forward of the free-turbine in the manner shown in FIG. 7.

It also should be understood that the foregoing refers only to preferred embodiments of the present invention, and that numerous changes and modifications thereto may be made without departing from the spirit and scope of the invention defined in the following claims.

What is claimed is:

1. Apparatus for reducing the noise emitted by the exhaust from the outlet at the aft end of a jet propulsion engine, comprising:

a housing configured for location at the outlet of the engine and having a portion spaced outwardly from the engine adjacent the aft end to define a duct having an air inlet, the duct also having an outlet downstream from the aft end of the engine;

a free turbine mounted for rotation within the housing and driven by the exhaust from the engine outlet so as to rotate independently of rotating elements in the jet engine;

a fan within the air inlet of the duct and driven by rotation of the free turbine to create an air flow through the duct, such that the air flow substantially surrounds the jet exhaust and thereby reduces the noise of the jet exhaust flowing from the outlet of the duct; and means for introducing fuel into the exhaust immediately upstream from the free turbine so that the fuel combusts and produces exhaust gas which increases the power available to drive the turbine, thereby driving the fan to produce more thrust for the engine.

2. Apparatus as in claim 1 wherein:

the means for introducing fuel is located in the housing located at the outlet of the engine.

3. A method for reducing the noise emitted from the exhaust from the outlet of a jet propulsion engine, comprising the steps of:

mounting a free-running turbine aft of the exhuast of the jet engine so that the turbine is driven by the exhaust, thereby reducing the speed of the jet exhaust;

providing a fan at the circumference of the turbine; and surrounding the fan with an air bypass duct having an air inlet upstream of the fan so that the fan compresses air which moves aft and mixes with the jet exhaust, so that the reduced speed of the jet exhaust and the mixing of the air from the fan reduces the noise from the jet exhaust; and selectively redirecting the jet exhaust upstream of the free-running turbine so that the exhaust is blocked from driving the turbine and instead has a component of thrust in a forward direction relative to the longitudinal axis of the engine.

4. Apparatus for reducing the noise emitted by the jet exhaust from the aft end of a jet propulsion engine, comprising:

a nacelle surrounding the engine and having an aft end;

a housing configured for location at the aft end of the nacelle and having means spaced from the nacelle adjacent the aft end of the engine to define a passage having an air inlet, the passage having an outlet downstream from the aft end of the engine;

a free turbine mounted for rotation within the housing and driven by the exhaust from the engine outlet so as to rotate independently of rotating elements in the jet engine;

a fan driven by the free turbine to compress air entering the passage from the air inlet, such that the air flows from the outlet of the passage to substantially surround the jet exhaust and thereby reduce the noise of the jet exhaust from the engine;

means located forwardly of the free turbine to selectively block the exhaust from flowing to the free turbine and redirect the jet exhaust from to a forward direction in relation to the engine, so that the thrust of the jet exhaust is reversed from the normal aftward direction of thrust; and door means associated with the nacelle and being normally closed but operative in association with the exhaust blocking means to an open position defining a path for the redirected jet exhaust, so that the redirected jet exhaust exits the engine on a path directed forwardly relative to the normal aftward direction of thrust.

5. Apparatus as in claim 4, wherein:

the blocking means comprises blocker doors located within the nacelle and selectably movable to either a normal position wherein the blocker doors are removed from the jet exhaust flowing to the free turbine, or to a reverse thrust position wherein the blocker doors are deployed to substantially deflect the exhaust away from the free turbine and to redirect the jet exhaust to the forward direction in relation to the engine; and means selectively operative to move the blocker doors either to the normal position and concurrently move the nacelle door means to the closed position so that the jet exhaust flows aft from the engine outlet to enter the free turbine, or to move the blocker doors to the reverse thrust position and concurrently move the nacelle door means to the open position so that the jet exhaust flows out the open nacelle door means with a forward directional component and thereby urges the engine in the aft direction.

6. Apparatus as in claim 5, wherein:

the passage within the housing comprises a circumferential air bypass duct surrounding the fan and having an air inlet spaced radially outwardly from the nacelle surrounding the engine, the bypass duct extending rearwardly to an outlet aft of the free turbine; and the fan extends into the bypass duct to compress the air from the air inlet and supply the compressed air to the outlet of the duct, so that the compressed air mixes with the exhaust gas from the jet engine.

7. Apparatus as in claim 5, wherein:

the housing includes a forward end portion disposed behind the aft end of the nacelle to provide the air inlet of the passage; and further comprising means selectively operative to close the air inlet of the passage so that the fan inlet does not receive outside air whenever the air inlet is closed.

8. Apparatus as in claim 7, wherein:

the means to close the air inlet comprises a cowl located adjacent the forward end portion of the housing and selectably translatable in a direction generally parallel to the longitudinal axis of the engine so as to close the forward end portion and thereby block air flow to the fan.

9. Apparatus as in claim 7, further comprising:

an inner duct within the housing for receiving the jet exhaust from the engine and directing that exhaust to the free turbine; and means associated with the inner duct for selectably diverting a portion of the jet exhaust to the inlet of the fan when the air inlet of the passage is closed, so as to maintain a flow of fluid to the fan.

10. Apparatus as in claim 5, further comprising:

means for introducing fuel into the exhaust immediately downstream from the free turbine so that the fuel combusts and produces exhaust gas which increases the thrust of the engine.

11. Apparatus for reducing the noise emitted by the jet exhaust from the aft end of a jet propulsion engine, comprising:

a nacelle surrounding the engine and having an aft end;

a housing configured for location at the aft end of the nacelle and having means spaced from the nacelle adjacent the aft end of the engine to define a passage having an air inlet, the passage having an outlet downstream from the aft end of the engine;

a free turbine mounted for rotation within the housing and driven by the exhaust from the engine outlet so as to rotate independently of rotating elements in the jet engine;

a fan driven by the free turbine to compress air entering the passage from the air inlet, such that the air flows from the outlet of the passage to substantially surround the jet exhaust and thereby reduce the noise of the jet exhaust from the engine; and means selectively operative to close the air inlet of the passage so that the fan inlet does not receive outside air whenever the air inlet is closed.

* * * * *